Patented Feb. 9, 1937

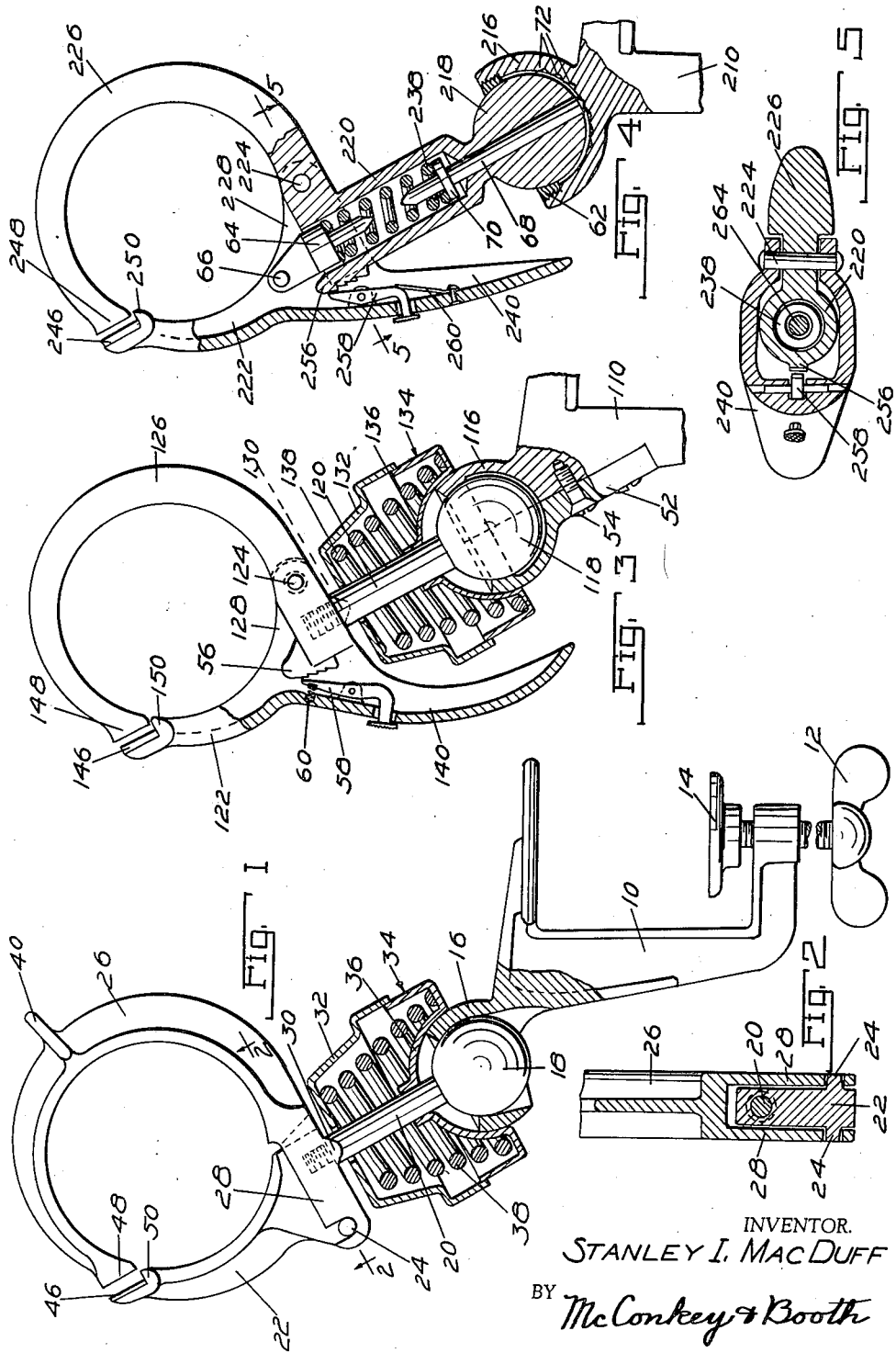

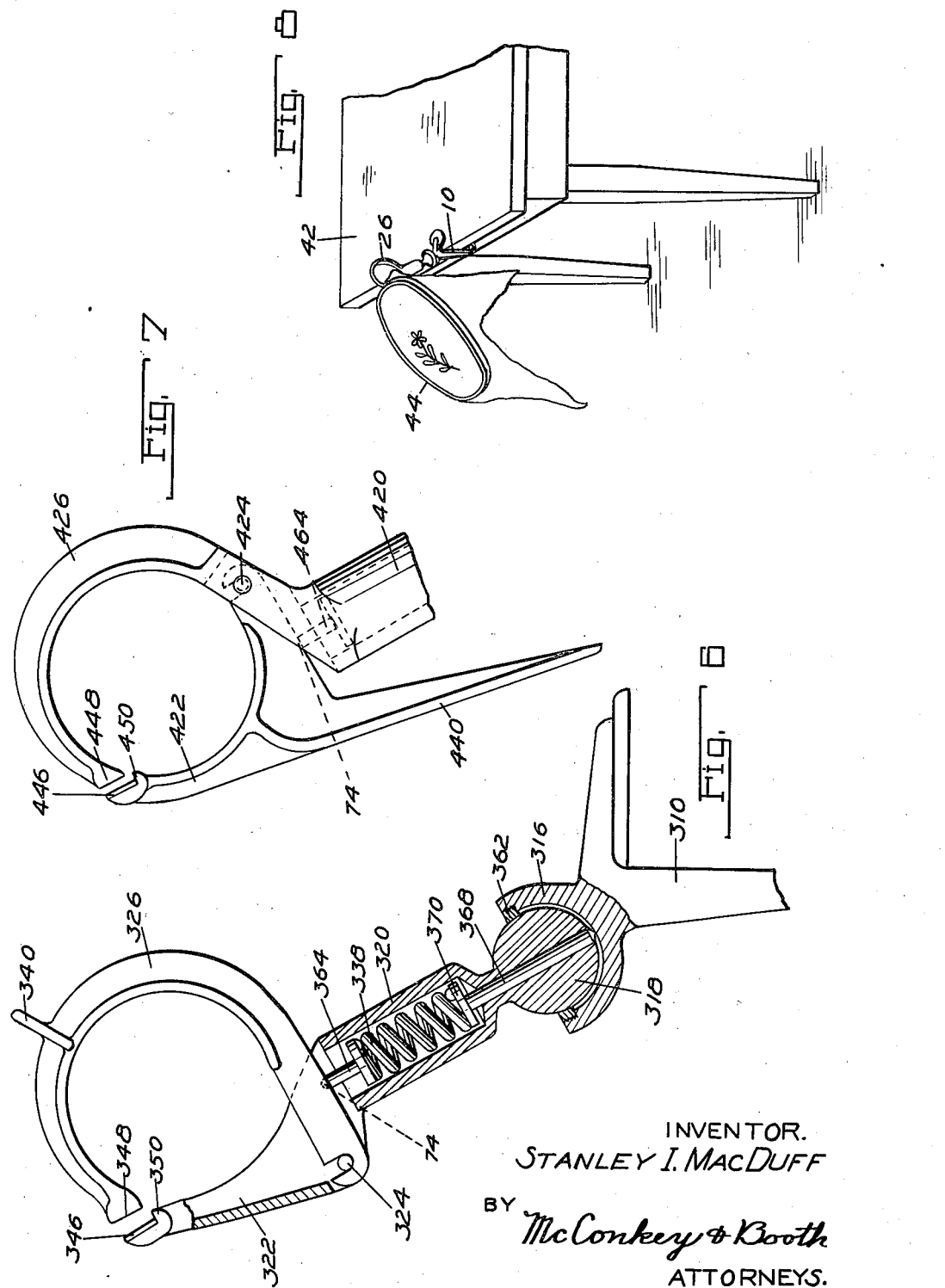

2,069,890

UNITED STATES PATENT OFFICE 2,069,890

WORK SUPPORT

Stanley I. MacDuff, Chicago, Ill., assignor to Irene T. Wood, Chicago, Ill.

Application January 23, 1936, Serial No. 60,391

19 Claims. (Cl. 45—24)

This invention relates to supports for embroidery frames or the like, and has for its object to provide such a support with easily operable means for gripping and holding the frame and to construct and arrange it so that it is readily shiftable to almost any position that may be desired. I also consider it highly desirable to construct the support in such a manner that it is not necessary to manipulate clamp nuts or the like in order to insert or remove the work, or to shift its position.

In all of the embodiments illustrated, a support member carrying jaws adapted to grip and hold the frame, and one of which is preferably C-shaped to encircle a space receiving cloth depending from the frame, is movably connected to a clamp by which it may be mounted on the edge of a table or the like. The joint connecting the clamp and the support member preferably consists of a ball and a socket receiving the ball.

An important feature of the invention relates to the use of a single spring for the double purpose of operating the jaws and resisting movement of the support member. The spring may either urge the ball and the socket frictionally together, so that while the support member can be moved when sufficient force is applied it will stay in whatever position it is moved to, or it may operate a locking plunger or the like.

The spring is preferably wholly inclosed, for example by stampings or the like which may be used to transmit its thrust to the jaws and to the joint between the clamp and the support member, or by forming the support member with a bore receiving the spring.

One of the jaws may, if desired, be provided with a spring latch or equivalent means for holding the jaws open while the work is being arranged between them.

The above and other objects and features of the invention, including various novel constructions and desirable arrangements of the parts of the work support, will be apparent from the following description of the illustrative embodiments shown in the accompanying drawings, in which:

Figures 1, 3, 4, 6, and 7 are side elevations partly in section of various embodiments of my invention;

Figure 2 is a section on the line 2—2 of Figure 1;

Figure 5 is a section on the line 5—5 of Figure 4; and

Figure 8 is a perspective view showing the way in which my invention is used.

Referring particularly to Figure 1 the invention, in a preferred embodiment, comprises a clamp 10, provided with a thumbscrew 12 and clamping washer 14 by means of which my novel instrument may be secured to a table or other support. It is shown as having, formed integrally therewith, at its upper corner, a ball socket 16 arranged so that a ball 18, having a stem 20 secured thereto, may be inserted therein from the bottom with the stem projecting through an opening in the upper part of the socket. This opening is so proportioned that the ball and its stem have a universal movement about the center of the ball within a conical angle of about 80° and the plane of the opening is preferably about 30° from the horizontal.

Rigidly secured to the end of the stem, by threads, or the like, is a clamp arm or jaw 22 provided on both sides with integral cylindrical lugs 24 located at some distance from the point of attachment of the stem 20. A C-shaped clamp arm 26, adapted to cooperate with the arm 22, is bifurcated at its lower end and its furcations 28, which are notched to pivotally engage the lugs 24, extend on both sides of the arm 22.

Each of the furcations 28 of the arm 26 is provided with a lug 30 adjacent the stem adapted to receive the upward thrust of a cup-shaped stamping 32 mounted on and coaxial with the stem 20. A second stamping 34, mounted on the stem 20 below the first stamping, is provided with a hemispherical socket 36 engaging the outer surface of the socket 16 and which is spherically formed concentrically with the recess in said socket. The stamping 34 has a peripheral flange telescoping within the first stamping 32 to form an enclosure for a strong coiled spring 38 compressed between the two stampings.

The upward thrust of the spring 38 transmitted to the clamp arm 26 through stamping 32 and lugs 30 urges this arm into clamping engagement with the arm 22 secured to the stem. The reaction from this force, transmitted to the stem 20 by pivots 24, draws the ball 18 into the socket 16 and the downward force of the spring 38 thrusts the socket of the stamping 34 down on the outer surface of the socket 16. The two forces in combination hold the clamp securely in any desired position. The novel construction of the device thus enables a single spring to actuate the clamp arms 22 and 26 and secure the ball joint.

In operation the clamp 10 is secured to a table 42 (Fig. 8) or other convenient support. By pressing on a wing 40 integral with the arm 26 the clamp arms 22 and 26 may be spread apart and an embroidery frame 44 (Fig. 8) placed between the clamping surfaces 46 and 48. The first of these is slightly bowed outwardly to fit the curve of the frame, but the second may be a plane surface.

An abutment 50 is provided on the arm 22 below the surface 46 to locate the embroidery frame between the jaws, and the jaws enclose a large generally circular space designed to accommodate the loose material which hangs from the frame. The frame, after being clamped, may be conveniently adjusted to any desired angular position by merely grasping the clamp and shifting it against the friction of the ball joint surfaces.

In the embodiment illustrated in Figure 3, in which parts similar to those in Figure 1 are designated by the same numeral plus 100, the socket 116 is split along an axial plane, one-half thereof being formed in a separate piece 52 secured to the clamp 110 by screws or the like 54. It will be noted that in this embodiment the socket is relieved so that only the upper part of the ball 118 contacts it.

The C-shaped clamp jaw 126 is in this case secured to the stem 120 and the jaw 122 has forked projections 128 extending on both sides of jaw 126 and pivoted on a pin 124. The lugs 130 are formed on the jaw 122 so that the spring 138 forces this arm into engagement with the jaw 126. A handle 140 for spreading the jaws is attached to, and may be integral with, the jaw 122. A serrated projection 56 cast integrally with clamp jaw 126 is adapted to be engaged by a thumb-operated latch 58 pivoted on the handle 140 and urged into engaged position by a small coil spring 60 so that the jaws may be held open to permit the user of my novel device to employ both hands in positioning the frame 44 (Fig. 8) and in arranging the excess goods depending from the frame.

In Figures 4 and 5 in which like parts are designated by the same reference numerals plus 200, the ball 218 is secured in the socket 216 by a ring 62 threaded into the socket and engaging the ball. The C-shaped clamp arm 226, the stem 220 and the ball 218 are all cast in one piece and the ring 62 is arranged to be passed over them.

The spring 238 is positioned in a bore in the stem 220 and thrusts upwardly to close the jaws 222 and 226 through a member 64 pivoted on the jaw 222 by a pin 66. The spring presses downward on a plunger 68 having at its upper end a spring engaging flange 70 and having at its lower end a conical point adapted to seat in any of a series of corresponding conical depressions 72 formed in the bottom of the socket 216. This construction forms a semi-positive locking means for the ball joint in any desired position.

In Figure 6, in which like parts are designated by the same reference numerals plus 300, the arm 322, the stem 320 and the ball 318 are formed in one piece. The arm 322 is U-shaped in cross-section and the lower end of arm 326 projects between the sides thereof and engages a pivot pin 324. The arm 326 is provided with a depression 74 pivotally engaged by member 364. In this embodiment friction alone is depended upon to hold the ball joint 316—318 in adjusted position, although depressions 72 could be provided for the locking plunger 368 the same as in Figure 4.

In the embodiment of Figure 7, the various parts are indicated by the reference characters of Figure 1 increased by 400. In this case, the spring socket 420 is of the same construction as the socket 320 in Figure 6, but is formed integrally with arm 426, and arm 422 is provided with a portion extending into a recess in arm 426 and notched to engage a pivot 424. The arm 422 has an extension 440 by which it is operated.

While several illustrative embodiments have been described in detail, it is not my intention to limit the scope of the invention to those particular embodiments, or otherwise than by the terms of the appended claims.

I claim:

1. A support for an embroidery frame or the like comprising a pair of jaws, a universally movable member supporting said jaws, and a single expansion spring having one end operatively acting on said jaws to move one relatively to the other and having its other end operatively acting on said universally movable member to resist movement thereof.

2. A support for an embroidery frame or the like comprising a pair of jaws, a universally movable member rigid with one of said jaws, a supporting clamp carrying said member, and a single expansion spring having one end operatively acting on said jaws to move one relative to the other and having its other end operatively acting on said member and clamp to resist relative movement thereof.

3. A support for an embroidery frame or the like comprising a pair of jaws, a universally mounted member supporting said jaws, and expansible pressure means having one end operatively acting on said jaws to move one relative to the other and having its other end operatively acting on said universally mounted member to resist movement thereof.

4. A support for an embroidery frame or the like comprising a clamp member and a support member one having a ball and the other a socket receiving the ball, jaws carried by the support member, and a spring urging said jaws together and also urging the ball and socket together to resist relative movement of said two members, said jaws having a part operating through the spring to increase the resistance to relative movement of the two members when the jaws are opened.

5. A support for an embroidery frame or the like comprising a clamp member and a support member having interengaging relatively movable parts forming a connecting joint, jaws carried by the support member and provided with a part movable in a direction to hold the jaws together, and a spring confined between said last part and one of said interengaging parts and urging said jaws together and also urging the parts of the joint together to resist relative movement of said two members.

6. A support for an embroidery frame or the like comprising a clamp member and a support member one having a ball part and the other a socket part receiving the ball part, jaws carried by the support member and provided with means operable to close the jaws, and a compressed coil spring confined and compressed between said means and one of said parts and urging said jaws together and also urging the ball and socket parts together to resist relative movement of said two members.

7. A support for an embroidery frame or the like comprising a clamp member and a support member having interengaging relatively movable parts forming a connecting joint, fixed and movable jaws carried by the support member, and a compressed coil spring confined and compressed between the movable jaw and one of said parts and urging said jaws together and also urging the parts of the joint together to resist relative movement of said two members.

8. A support for an embroidery frame or the like comprising a clamp having a socket, a support member having a ball seated in said socket, means resisting turning of the ball in the socket, and two jaws which are spring-pressed together and which are carried by the support member and which are formed to encircle work depending from a frame held between them and one of which has a latch for holding the jaws spread apart when desired.

9. A support for an embroidery frame or the like comprising a clamp having a socket, a support member having a ball seated in said socket, means resisting turning of the ball in the socket, and two jaws which are carried by the support member and which are formed to encircle work depending from a frame held between them, the resisting means including a plunger carried by said ball and engaging said socket and a spring compressed between one jaw and said plunger and operating to close the jaws and to actuate said plunger.

10. A support for an embroidery frame or the like comprising a clamp having a downwardly facing annular partial spherical socket having its upper surface formed on a sphere, a support member passing through said socket and having at its end a ball seated against said socket, a first jaw rigid with the upper end of the support member, a second jaw cooperating with the first jaw to hold the frame and pivoted to the first jaw at one side of the axis of the support member, telescoping stampings one of which engages the pivoted jaw and another of which has a spherical concavity engaging the upper surface of the socket, and a compressed coil spring arranged with the support member at its axis and which engages and is confined between said stampings.

11. A support for an embroidery frame or the like comprising a clamp having a downwardly facing annular partial spherical socket having its upper surface formed on a sphere, a support member passing through said socket and having at its end a ball seated against said socket, a hemispherical part engaging said upper surface, a first jaw rigid with the upper end of the support member, a second jaw cooperating with the first jaw to hold the frame and pivoted to the first jaw at one side of the axis of the support member, and a compressed coil spring arranged with the support member at its axis and confined between the pivoted jaw and the hemispherical part and which urges the pivoted jaw toward the rigid jaw and which also draws the ball frictionally against the socket.

12. A support for an embroidery frame or the like comprising a clamp having a downwardly facing annular partial spherical socket having its upper surface formed on a sphere, a support member passing through said socket and having at its end a ball seated against said socket, a part sleeved on the support member and engaging said upper surface, a first jaw rigid with the upper end of the support member, a second jaw cooperating with the first jaw to hold the frame and pivoted to the first jaw at one side of the axis of the support member, and a compressed coil spring arranged with the support member at its axis and confined between the pivoted jaw and said part and which urges the pivoted jaw toward the rigid jaw and which also draws the ball frictionally against the socket, said jaws being formed with a large space between them below the parts which engage the frame, to receive work depending from the frame.

13. A support for an embroidery frame or the like comprising a clamp having a downwardly facing annular partial spherical socket having its upper surface formed on a sphere, a support member passing through said socket and having at its end a ball seated against said socket, a part sleeved on the support member and engaging said upper surface, a first jaw rigid with the upper end of the support member, a second jaw cooperating with the first jaw to hold the frame and pivoted to the first jaw at one side of the axis of the support member, and a compressed coil spring arranged with the support member at its axis and confined between the pivoted jaw and said part and which urges the pivoted jaw toward the rigid jaw and which also draws the ball frictionally against the socket, said jaws having means to hold them spread apart against the resistance of said springs.

14. A support for an embroidery frame or the like comprising a clamp having a downwardly facing annular partial spherical socket having its upper surface formed on a sphere, a support member passing through said socket and having at its end a ball seated against said socket, a part sleeved on the support member and engaging said upper surface, a first jaw rigid with the upper end of the support member, a second jaw cooperating with the first jaw to hold the frame and pivoted to the first jaw at one side of the axis of the support member, and a compressed coil spring arranged with the support member at its axis and confined between the pivoted jaw and said part and which urges the pivoted jaw toward the rigid jaw and which also draws the ball frictionally against the socket, said jaws having respectively interengaging latch members one of which is spring-pressed against the other, to hold the jaws spread apart when desired against the resistance of said spring.

15. A support for an embroidery frame or the like comprising a clamp member and a support member movably connected by a joint including a ball and a socket receiving the ball, a plunger carried by the support member and engaging the clamp member and resisting relative movement of said members, a jaw rigid with the support member, a pivoted jaw cooperating with the rigid jaw to hold a frame, and a compressed coil spring confined between the plunger and the pivoted jaw and operating both of them.

16. A support for an embroidery frame or the like comprising a movable support member having a jaw rigid therewith, a C-shaped jaw encircling a space for work depending from the frame and arranged at one end to cooperate with the rigid jaw to grip and hold the frame and having at its other end at one side of the support member a pivot connection with the rigid jaw and having adjacent its pivoted end a part extending crosswise of said support member substantially at right angles thereto, and a spring carried by the support member and acting on said crosswise part of the C-shaped jaw in the direction of the length of the support member.

17. A support for an embroidery frame or the like comprising a movable support member having a jaw rigid therewith, a C-shaped jaw encircling a space for work depending from the frame and arranged at one end to cooperate with the rigid jaw to grip and hold the frame and having at its other end at one side of the support member a pivot connection with the rigid jaw and having adjacent its pivoted end a part extending crosswise of said support member substantially at right angles thereto, a spring carried by the support member and having one end operatively acting on said crosswise part of the C-shaped jaw in the direction of the length of the support member, and a clamp engageable with a table or the like and having a movable connection with the support member, said spring having its other end operatively arranged to resist relative movement of the clamp and the support member.

18. A support for an embroidery frame or the like comprising a movable support member having rigid therewith a C-shaped jaw encircling a space for work depending from the frame, a second jaw cooperating with the C-shaped jaw to grip and hold said frame and which is pivoted at its end to the C-shaped jaw at one side of the support member and which has a part adjacent its pivoted end extending crosswise of the support member substantially at right angles thereto, and a spring carried by the support member and acting on said crosswise part of the second jaw in the direction of the length of the support member.

19. A support for an embroidery frame or the like comprising a movable support member having rigid therewith a C-shaped jaw encircling a space for work depending from the frame, a second jaw cooperating with the C-shaped jaw to grip and hold said frame and which is pivoted at its end to the C-shaped jaw at one side of the support member and which has a part adjacent its pivoted end extending crosswise of the support member substantially at right angles thereto, a spring carried by the support member having one end operatively acting on said crosswise part of the second jaw in the direction of the length of the support member, and a clamp engageable with a table or the like and having a movable connection with the support member, said spring having its other end operatively arranged to resist relative movement of the clamp and the support member.

STANLEY I. MacDUFF.